B. RICE.
Blinder for Horses.
No. 204,844. Patented June 11, 1878.
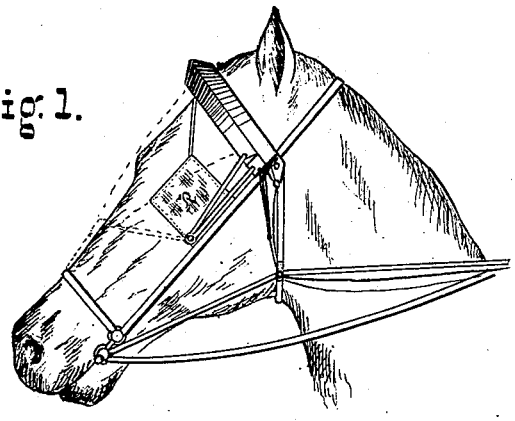
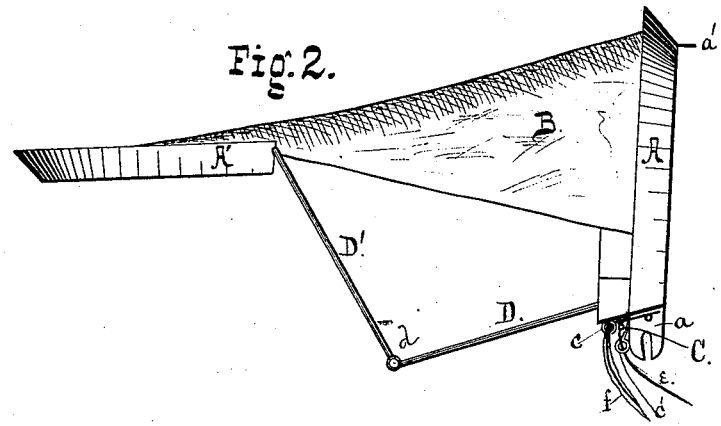
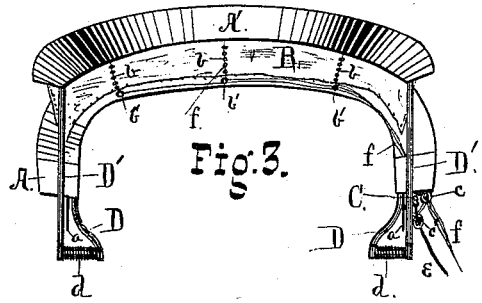
Witnesses,
Inventor
Bernard Rice
by
R. W. Williams
Attorney.

UNITED STATES PATENT OFFICE.

BERNARD RICE, OF BROOKLYN, NEW YORK.

IMPROVEMENT IN BLINDERS FOR HORSES.

Specification forming part of Letters Patent No. 204,844, dated June 11, 1878; application filed April 12, 1878.

*To all whom it may concern:*

Be it known that I, BERNARD RICE, of the city of Brooklyn, Kings county, State of New York, have invented certain new and useful Improvements in Blinders for Horses; and I hereby declare the same to be fully, clearly, and exactly described as follows, reference being had to the accompanying drawings, in which—

Figure 1 represents the device in side elevation applied to an ordinary bridle. Fig. 2 is a similar enlarged view, the blind being let down, as shown in dotted lines, Fig. 1; and Fig. 3 is a front view of the device.

This invention is designed to furnish means for enabling a driver to cover the eyes of his horse without leaving the vehicle, and for bringing a horse more completely and quickly under control should he become frightened or show a disposition to run away.

It is well known that fractious or vicious animals, and horses in particular, are instantly quieted and rendered docile upon blinding them, the effect upon timid animals being to cause a sense of helplessness and dependence, which renders them perfectly tractable and obedient. Taking advantage of these well-known effects of blinding horses, I have devised a hood or blind arranged to occupy a position upon the horse's forehead, and adapted to be instantly lowered in front of his eyes when occasion arises.

The said device consists of a pair of dished metallic plates, A A', of the proper curve to fit across the forehead of the horse just above the eyes, the said plates being attached to arms D D', pivoted together at *d*, as shown.

Between the plates A A' is stretched a curtain, B, having a series of rings, *b b*, through which pass cords *f f*, that are attached to the plate A' and reeve through rings *b' b'* attached to the plate A.

The cords *f*, preferably three in number, are led through a ring, *c*, upon the plate A, and thence through another ring upon the throat-latch to the reins. A spring, C, is arranged to press upon the lines *f* and prevent their slipping, a cord, *e*, also leading to the reins and within reach of the driver, being attached to the spring.

The plate A is furnished with ears *a a'*, which are attached in any convenient manner to the cheek and top straps of the bridle.

Springs *d d* are wound around the pivots of the arms D D', and normally retain the device, as shown in Fig. 2, the curtain B being drawn tense.

The operation of the device is as follows: When it is desired to lower the blind the spring C is withdrawn by means of the cord *e*, when the blind falls, as shown in dotted lines, Fig. 1. In order to raise the blind, the cord *f*, the three being preferably joined, is pulled, the plate A' being thereby drawn up against the plate A, the curtain being snugly clewed up between them.

The device will be found especially convenient for physicians and others who are constantly required to leave their vehicles, it being only necessary to lower the blind in order to prevent the horse, for an indefinite time, from bolting or straying.

In approaching railway stations or crossings, or under any other circumstances calculated to frighten a horse or cause him to run away, the blinder will be found invaluable.

When folded as shown in Fig. 1, it is not conspicuous, and is rather ornamental than otherwise.

Having thus described my invention, what I claim as new, and desire to secure by Letters Patent, is—

1. A horse-blinder consisting of a pair of plates adapted to be secured over the forehead of the animal, the lower plate being hinged to the upper one, the said plates having between them a curtain or screen adapted to be lowered in front of the eyes of the horse, substantially as described.

2. In combination with the plates A A', hinged together and having spring *d*, the screen B, cords *e f*, and spring-catch C, substantially as described.

BERNARD RICE.

Witnesses:
 ADOLPH B. RICE,
 ADAM J. MEES,